APPARATUS FOR SYSTEM OF VISUAL SIGNAL COMMUNICATION

Filed Sept. 3, 1946 4 Sheets-Sheet 1

INVENTOR.
MOSES ALLEN
BY
ATTORNEY

Aug. 22, 1950 M. ALLEN 2,519,993

APPARATUS FOR SYSTEM OF VISUAL SIGNAL COMMUNICATION

Filed Sept. 3, 1946 4 Sheets-Sheet 2

MATCH WITH FIG. 3

INVENTOR.
MOSES ALLEN

BY

ATTORNEY

Aug. 22, 1950 M. ALLEN 2,519,993

APPARATUS FOR SYSTEM OF VISUAL SIGNAL COMMUNICATION

Filed Sept. 3, 1946 4 Sheets-Sheet 3

MATCH WITH FIG. 2.

INVENTOR.
MOSES ALLEN

BY

ATTORNEY

Aug. 22, 1950 M. ALLEN 2,519,993

APPARATUS FOR SYSTEM OF VISUAL SIGNAL COMMUNICATION

Filed Sept. 3, 1946 4 Sheets-Sheet 4

INVENTOR.
MOSES ALLEN
BY
ATTORNEY

Patented Aug. 22, 1950 2,519,993

UNITED STATES PATENT OFFICE 2,519,993

APPARATUS FOR SYSTEM OF VISUAL SIGNAL COMMUNICATION

Moses Allen, Compton, Calif., assignor to Thomas Ross Welch, Los Angeles, Calif.

Application September 3, 1946, Serial No. 694,655

8 Claims. (Cl. 177—346)

This invention relates to systems of visual signaling and therein particularly to a system employing sign apparatus having symbol formers which are changeable during normal operation of the sign as to the symbols formed thereby.

It is one of the objects of this invention to provide a system of this character which makes efficient use of apparatus; and so effects economy in the construction, operation, and maintenance thereof.

It is another object of this invention to provide in an apparatus for the electrical control of a symbol former having a plurality of connector groups forming a plurality of series of selector groups, each selector of which comprises one of the groups of connector contacts for successive energizations of the control of the symbol former over single circuit conductors individually connected to connector contacts, a minimum of circuit makings and breakings and a minimum of electrical conductors in the control apparatus.

Other objects and advantages of my invention will appear from the following specification considered in conjunction with the accompanying drawings, in which.

Figure 1:
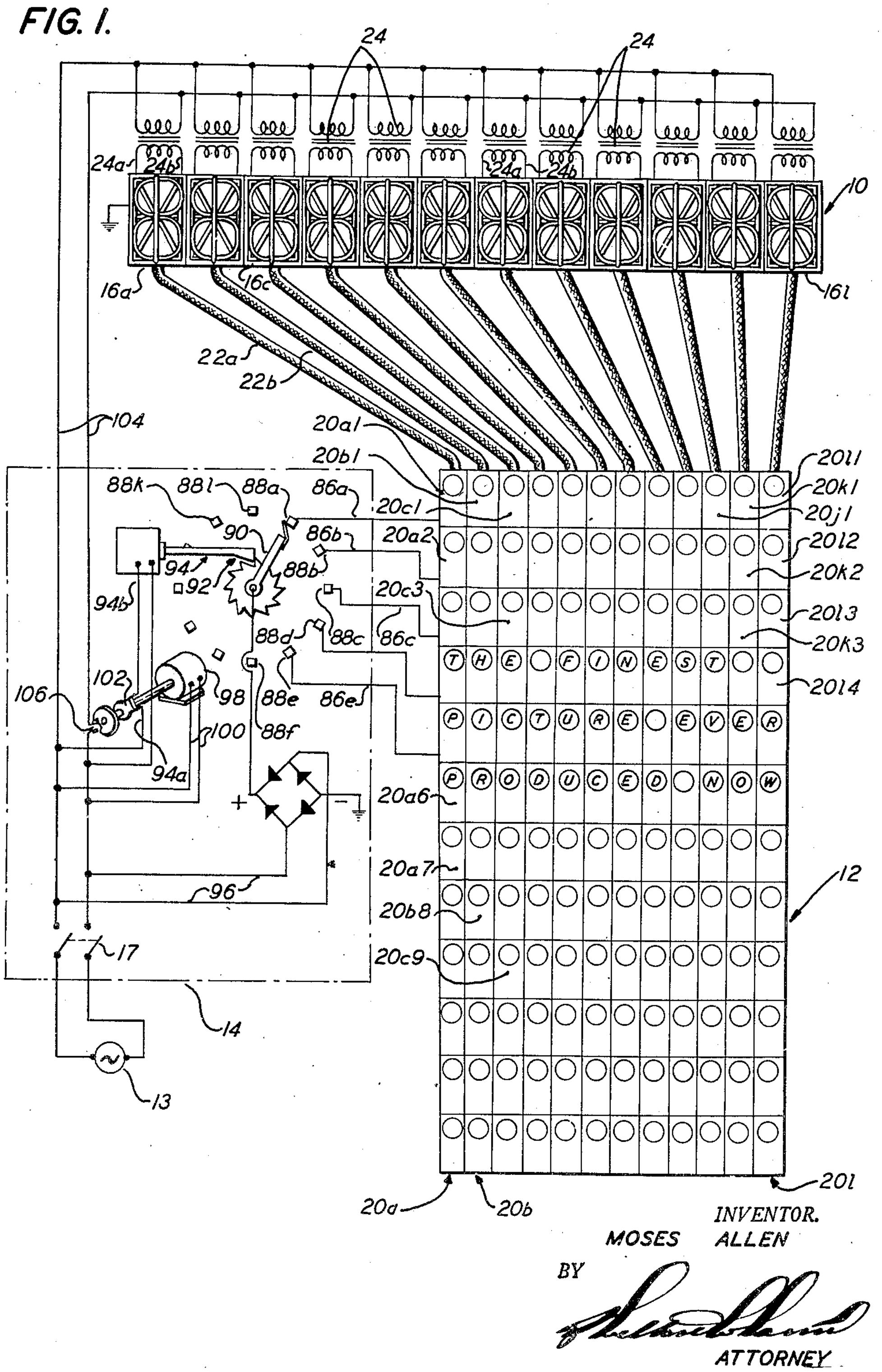
Fig. 1 is a general apparatus diagram showing the major elements, their arrangement, and interconnection.

Figs. 4*a* to 4*e* are miscellaneous views of symbol selector details.

The sign system comprises a visual signal transmitter or sign assembly 10, a signal program control apparatus 12, energy applying apparatus 14, and a source of alternating current power 13.

Signal transmitter 10 comprises a group of symbol formers 16, each of which is so constructed that under control to be referred to, any of many symbols are consecutively obtainable from each symbol former. The consecutive symbols to be produced in an individual symbol former are selectively provided for by a series of symbol selectors embodied in the apparatus 12. In the drawings a symbol former 16*a* is shown to receive control currents from a series 20*a* of symbol selectors, 20*a*1, 20*a*2, 20*a*3, etc., which are illustrated as arranged in verticel array in the program apparatus 12, via a multiple conductor control cable 22*a*. By similar series of symbol selectors 20*b*, 20*b*1, etc., series 20*c*, 20*c*1, etc. and so on the other symbol formers 16*b*, 16*c*, etc receive control currents over several multiple conductor control cables 22*b*, 22*c*, etc.

In the control apparatus 12 the several series 20*a*, 20*b*, of symbol selectors 20*a*1, 20*a*2, etc.; 20*b*1, 20*b*2; etc., are coordinated for simultaneous control in groups of one per group from each series. Thus, as shown in Fig. 1, a horizontal row of symbol selectors 20*a*1; 20*b*1; 20*c*1; and so on; provide for simultaneously forming a group of symbols or letter-forming words, or word groups by certain or all of the symbol formers 16*a*, 16*b*, etc.; and a second row of symbol selectors 20*a*2, 20*b*2, etc., provides for thereafter simultaneously forming a second group of symbols by certain of the symbol formers 16*a*, 16*b*, etc.

Figure 3:
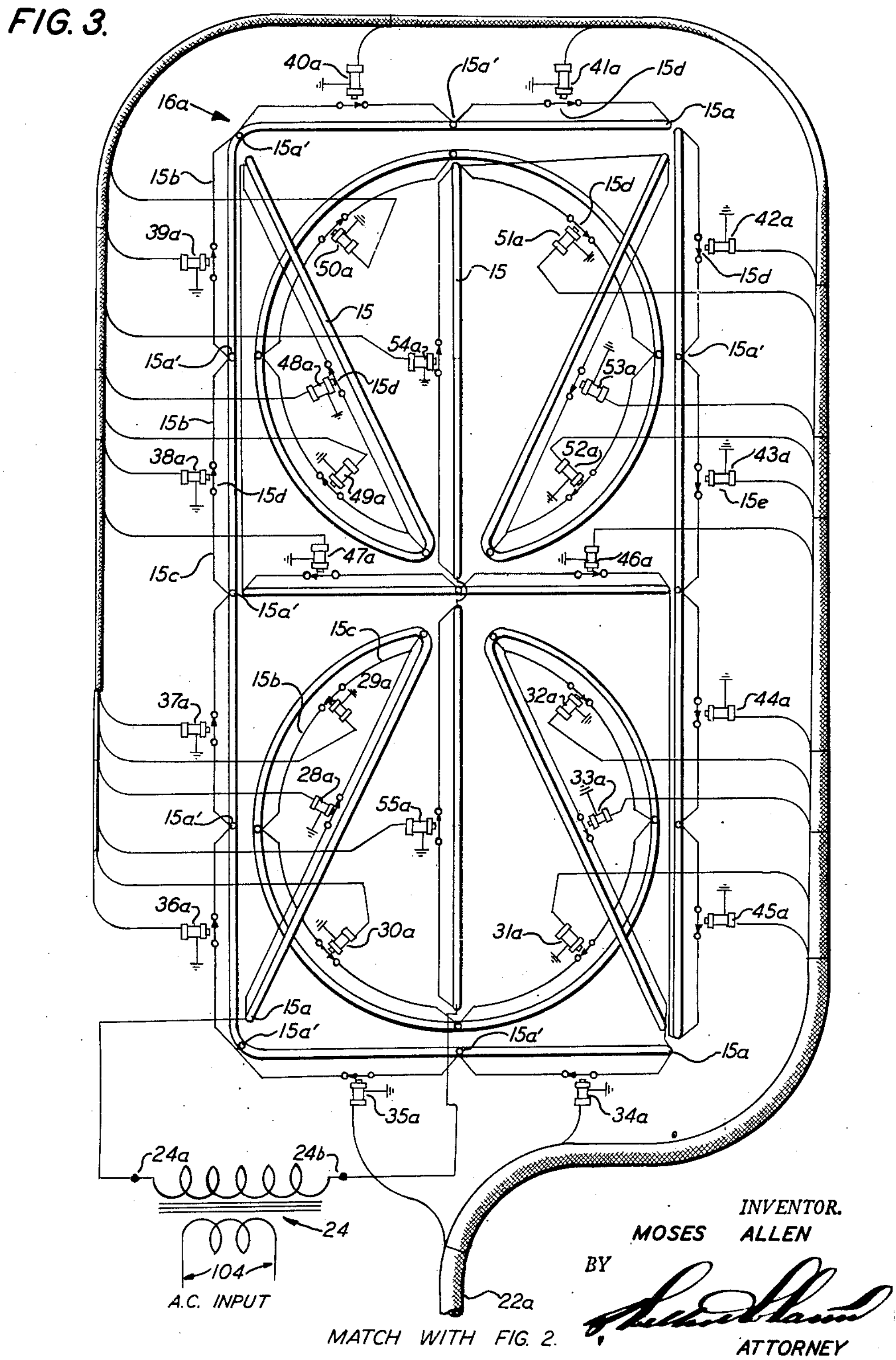
Fig. 3 is a wiring diagram of one of the symbol formers.

Each symbol former 16 is formed by components of closed tubing 15 having continuous bodies of gas therein, into which electrodes 15*a* project. Transformers 24 are connected to endmost electrodes 15*a* in any component tube 15 and provide high voltage from their output terminals 24*a* and 24*b* sufficient to produce illumination throughout the tube length between these end electrodes 15*a*. Additional electrodes 15*a*′ project into the gas of the component tubes 15 and are conductively joined together by conductors 15*b* and 15*c*, and by normally closed switches 15*d*. The switches 15*d* as shown in Fig. 3 are openable by electromagnets 28*a* to 55*a*. The electromagnets of a symbol former are individually and selectively energized over distinct conductors contained in the cable 22.

When any switch 15*d* is closed, the tube remains non-luminous between the electrodes 15*a*′ connected together over conductors 15*b* and 15*c* thereby even when voltage is applied to the end electrodes 15*a* of the tube concerned. When the switch 15*d* is open under the same conditions of applied voltage, the illumination of the tube between those electrodes results.

The tubing and electrodes of a symbol former 16 are arranged as shown so that by preparing for simultaneous energization certain combinations of one or more of the electromagnets 28*a*—55*a*, their switches 15*d* are thereby also prepared for subsequent simultaneous actuation to open position, and symbols or letters corresponding to such combinations are formed by illumination upon applying voltage to the end terminals 15*a* of the various tube components of the symbol former.

Figure 2:
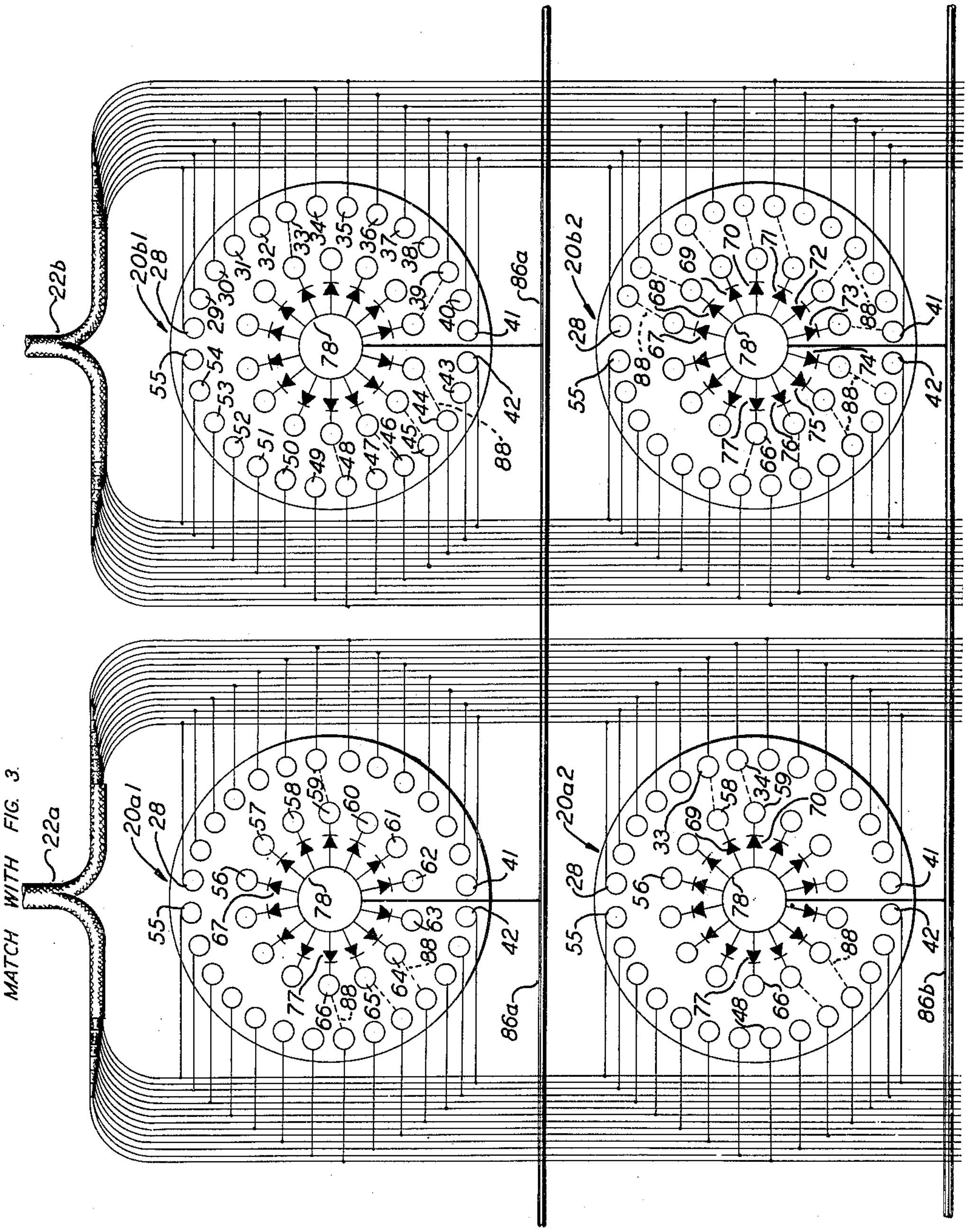
Fig. 2 is a fragmentary wiring diagram which shows details of the circuits and circuit components employed.

The symbol selectors of the program panel 12 are illustrated in more detail in Fig. 2 which shows four symbol selectors of which two are shown from a series of selectors and two from each of two groups of selectors. Specifically, the symbol selectors 20a1 and 20a2 of series 20a, and symbol selectors 20b1 and 20b2 of series 20b are shown. Selectors 20a1, and 20b1 form part of one group and selectors 20a2 and 20b2 form part of a second group.

The symbol selectors are identical except as to parts of the connectors which will be referred to after the selectors have been described as to their details which are identical in character.

A description of all symbol selectors as such is made in connection with selector 20a1 of Fig. 2, which comprises a first group of connector terminals 28 to 55 inclusive, and a second group of connector terminals 56 to 66 inclusive. Connector terminals 56 to 66 are individually connected through valves 67, 68 . . . 77 to a common terminal bus 78. Valves 67, 68 . . . and 77 provide for current flow in one direction only and are all arranged to permit current flow in the same direction with respect to bus 78. Thus, as shown, current is allowed to flow freely through the valve 67 from the bus 78 to a terminal 56. Substantial current flow from 56 to 78 is, however, prevented by the valve 67.

The valves 57 to 77 are commonly and well known as dry disc rectifiers, and may be of the copper oxide or selenium type.

Means are provided to enable an operator to quickly connect all of the required terminals in the outer circle of terminals 28, 29 . . . 55 to a corresponding number of required terminals in the inner circle of terminals 56, 57 . . . 66.

The symbol selectors are illustrated in Figs. 4a to 4e each to comprise a base 80 of insulating material providing pin sockets 80a forming the various terminals 28 to 55 inclusive which come flush with the face of the base 80. All the symbol selector bases are arranged on the face of the apparatus 12.

Figure 4D:
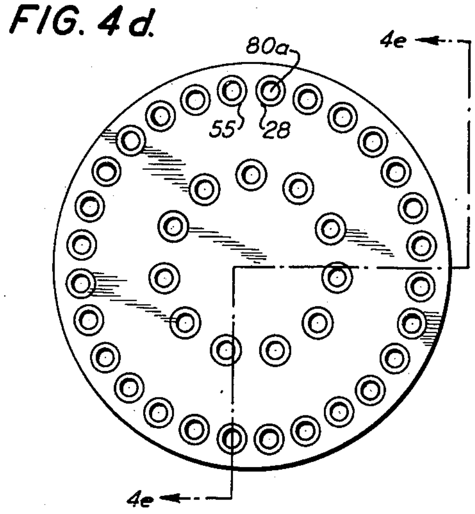
Figure 4E:
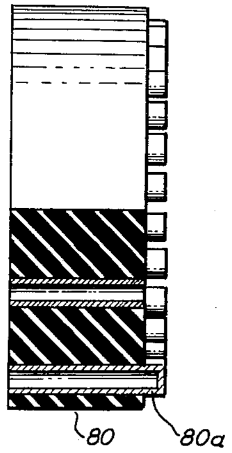
Figure 4A:
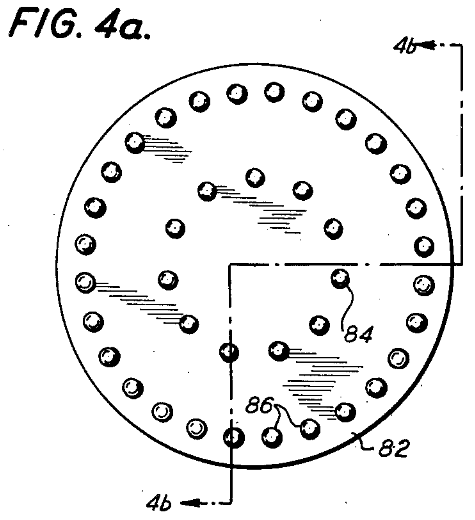
Figure 4B:
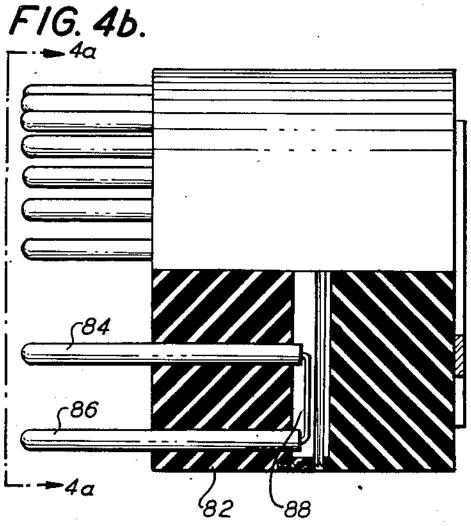
Figure 4C:
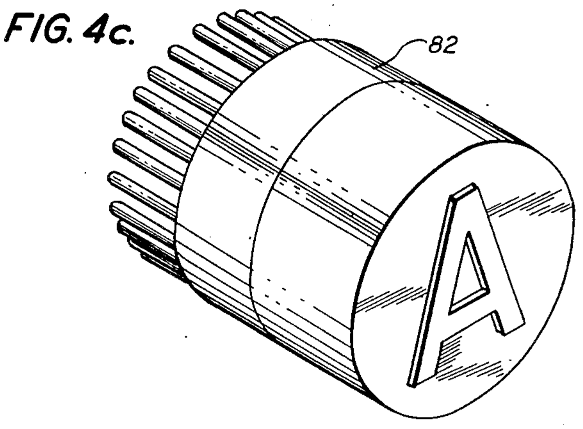

The symbol selectors include separable plugs illustrated in Fig. 4c to comprise a disc-like base 82 of insulating material provided with enough conductor pins 84 and 86 arranged to slip snugly into all the pin sockets 80a. The back face of the plug, as viewed in Fig. 4c, is provided with a symbol (as A) by which the plug is identified as providing such connections from the outer to the inner circles of sockets on the base 80 as to prepare the connected symbol former to effect the symbol (as A). The certain required pins 84 and 86 are suitably joined by jumpers 88 as shown in Fig. 4b.

Suitable aligning means are provided on plugs 82 and the base 80 so that the various plugs always enter their corresponding pins in certain pin sockets only. To this end, one extra socket may be provided plugged full and a corresponding extra pin cut off. In this way the plug can only be inserted when in one position of registration.

The various buses 78 of a horizontal row of symbol selectors are connected to a common conductor. Thus, the buses 78 of the top row are connected by a common conductor 86a; and the buses 78 of the succeeding horizontal rows are electrically connected by common conductors 86b, 86c, and so on. The various conductors 86a, 86b extend as in the form of a multiple conductor cable into apparatus 14 wherein they are respectively connected to the various contacts 88a, 88b, etc. of a stepping switch comprising a contact arm 90 driven by a pawl and ratchet mechanism 92, the pawl of which is reciprocated on occasion by a solenoid and plunger assembly 94. The contact arm 90 is connected to a source of current which is preferably a direct current source and which is shown to be formed by a bridge connected rectifier receiving power from the alternating current supply 13 over the conductors 96.

A constant speed motor 98 energized from the alternating current supply over the conductors 100 actuates two switches periodically. One switch 102 is included in circuit with solenoid and plunger assembly 94, which is supplied by conductors 94a, 94b and 94c through a switch 102.

Transformers 24 are energized over a pair of conductors 104 through a periodically open switch 106 driven by the motor 98.

In general, the operation of the system is as follows: With the switch 17 closed and the switch 102 open, the arm 90 is in contact with the contact 88a. Current now flows from the rectifier through the arm 90 to the contact 88a, conductor 86a, and, as shown in Fig. 2, through all of the buses 78 of the top group of symbol selectors 20a1, 20b1, 20c1, 20d1, etc., (note that at this time no current flows through the conductors 86b, 86c, etc.). Arriving at the bus 78, for example, of the selector 20a1, current flows through a valve 70, a valve 75, a valve 76, a valve 77, with sockets 59, 64, 65 and 66. As shown by dotted lines in Fig. 2, these pin sockets are respectively connected to the pin sockets 34, 45, 46 and 48. These dotted lines show the connections 88 correspond to the jumpers 88 shown in Fig. 4b, and are effected by the station of the corresponding plugs 82 into the pin sockets 80a of the receptacle 20a1. Current accordingly flows from 59 to 34 into the corresponding conductor of the cable 22a and leads to the coil of the corresponding electromagnet 34a on the symbol former 16a. Current also flows from the pin socket 64 over a jumper 88 to the pin socket 45 and is connected to a corresponding conductor in the cable 22a extending to a coil of an electromagnet 45a forming part of the symbol former 16a in the sign 10. As shown in Fig. 2, connections are made in the symbol selector 20a1 in the top horizontal group of connectors. Similarly, as shown in Fig. 2, a symbol selector 20b1 effects connection to six conductors in the cable 22b leading to the symbol former 16b at the sign 10. It will be evident that the number of, and the particular electromagnets so energized, are determined by the particular pin sockets in the symbol selector, which are connected together by the particular plug 82 selected to be inserted in the receptacle.

The current which reaches the coils at this time returns to the rectifier by a common conductor, such as is furnished by grounding the negative terminal of the rectifier and the coil of the magnet at one end thereof.

While the current is flowing to the various electromagnets on the sign 10 as selected by the various symbol selectors 20a1, etc. of the upper group of symbol selectors on the panel 12, current is also flowing to the primary of the transformers 24 through the switch 106 and the sign is illuminated in accordance with the selections made by the symbol selectors of the upper group so long as the contact arm 90 remains in contact with the contact 88a of the stepping switch. This condition of illumination continues until the switch 106 opens the circuit of the transformers 24, whereupon the sign 10 is deenergized. While the sign is so deenergized the switch 102 energizes the solenoid mechanism 94 to move the contact arm 90 to contact 88b. The second group of symbol selectors 20a2, 20b2 and 20c2, etc. forming the second row of symbol selectors in the panel 12 are now energized by the rectifier, and upon closure of the switch 106 again, the transformers 24 are again energized and the sign 10 is illuminated in accordance with the symbols shown by the second group of connectors connected to the common conductor 86b. By successive movements of the arm 90 a message, as set forth on the board 12, is transmitted by the sign 10 cyclically so that the message is repeated continuously. Suppose, referring to Fig. 2, that different plugs are placed in the connectors 20a1 and 20a2, which have one or more identical pin connections 88. When the current passes into the conductor in the cable 22a, which is connected to the pin socket 34, symbol selector 20a1 and the bus 78 in said symbol selector 20a1, it is prevented from passing downward along the conductor connected to the pin socket 34 and into the corresponding pin socket 34 in the symbol selector 20a2 by the presence of the valve 70 in the symbol selector 20a2, to thus prevent current from flowing in the direction toward the bus 78 in the symbol selector 20a2. In a like manner, all of the valves 70 of the symbol selectors 20a2, 20a3, 20a4, etc. prevent the flow of current into the busses 78 forming parts of said symbol selectors. In this way, current is prevented from, referring particularly to the symbol selector 20a2 shown in Fig. 2, passing through, for example, the valve 69 of the symbol selector 20a2 and proceeding from the socket 33 to an associated electromagnet 33a in the symbol former 16a of the sign 10.

In this way, by preventing interference of the operation under the control of the symbol selector 20a1 by the balance of the series of the symbol selectors in the column 20a1, 20a2, etc., a large number of otherwise required conductors are replaced by the relatively small number of conductors 86a, 86b, etc.

I claim as my invention:

1. An apparatus for the electrical illumination of a visual sign by a succession of groups of simultaneously appearing symbols in the same area of the sign comprising, in combination: a plurality of symbol selectors each of which comprises a number of connector terminals; a plurality of symbol formers each of which is provided with several electrically actuatable control elements, a plurality of conductors individually electrically connecting the control elements to one connector terminal of each of several of said selectors; electrically conductive means individual to each symbol selector and itself connected by several unidirectionally conductive conductors to several other connector terminals of the symbol selector; and means including a source of current and a contact for energizing the individual electrically conductive means at different times.

2. In an electric sign, in combination: at least one symbol former including a plurality of electromagnets for controlling the energization of sections of said symbol former; a stepping switch having a moving contact connected to a source of current supply and a series of stationary contacts; at least one series of symbol selectors in which each symbol selector includes a group of connector contacts for permanent connection with the electromagnets and a conductor connected to each one of each of such connector contacts in each of the symbol selectors in the series of symbol selectors and to one of the electromagnets of the symbol former and in which each symbol selector includes a second group of connector contacts for permanent connection to a stationary contact of the stepping switch; and a plurality of distinct conductors, each of which extends from a connector contact of said second group of connector contacts in a symbol selector to connect to one of the stationary contacts of the stepping switch, said last mentioned distinct conductors including therein a valve having relatively high conductivity for current flow in one direction and substantially no conductivity for current flow in the other direction.

3. In an electric sign system, in combination: a sign having a series of symbol formers each of which symbol formers includes a plurality of symbol forming parts usable in combinations of one or more parts to effect by each combination a distinct symbol in each symbol former; a corresponding plurality of current responsive devices for individually rendering the parts effective; a control panel having a series of symbol selectors corresponding to each symbol former in the sign, each symbol selector including a group of connector contacts, there being a connector contact in each symbol selector corresponding to each current responsive device in a symbol former, and a plurality of at least as many additional connector contacts in each symbol selector as the maximum number of symbol forming parts ever required to be used at any one time in a symbol former; groups of said symbol selectors comprising a symbol selector from each series being arranged in a row on the panel in simulation of the series of symbol formers on the sign; the corresponding connector contacts in each series of symbol selectors being connected together and to the current responsive devices of the symbol formers in the same order of occurrence of the symbol formers on the sign and the symbol selectors on the board; a stepping switch having a number of stationary contacts corresponding to the number of groups of symbol selectors on the panel; a stepping switch conductor connected to one of the stationary contacts of the stepping switch and extending toward the control panel; and a valve conductor including a one-way current flow valve in series therein extending from each of the additional connector contacts of all such connector contacts occurring in a single group of symbol selectors to the stepping switch conductor.

4. In an electric system, in combination: an apparatus having a series of units, each unit of which includes a plurality of electrically operable parts usable in combination of one or more parts to effect by each combination a distinct result in each unit; a corresponding plurality of current responsive devices for individually rendering the parts effective; a control panel having a series of unit selectors corresponding to each unit in the apparatus, each unit selector including a group of connector contacts, there being a connector contact in each unit selector corresponding to each current responsive device in a unit, and a plurality of at least as many additional connector contacts in each unit selector as the maximum number of unit forming parts ever required to be used concurrently; groups of said unit selectors comprising a unit selector from each series being arranged in a row on the panel in simulation of the series of units on the apparatus; corresponding connector contacts in each series of unit selectors being connected together and to the current responsive devices of the units in the same order of occurrence of the units on the apparatus and the unit selectors on the board; a stepping switch having a number of stationary contacts corresponding to the number of groups of unit selectors on the panel; a stepping switch extension conductor connected to one of the stationary contacts of the stepping switch and extending toward the control panel; and a conductor including a one-way current flow valve in series therein extending from each of the additional connector contacts of all such connector contacts occurring in a single group of unit selectors to the stepping switch conductor.

5. In an electric sign system: a sign having a series of symbol formers each of which symbol formers includes a plurality of symbol forming parts usable in combinations of one or more parts to effect by each combination a distinct symbol in each symbol former; a corresponding plurality of current responsive devices for individually rendering the parts effective; a series of symbol selectors corresponding to each symbol former in the sign, each symbol selector including a group of connector contacts, there being a connector contact in each symbol selector corresponding to each current responsive device in a symbol former, and a plurality of at least as many additional connector contacts in each symbol selector as the maximum number of symbol forming parts ever required to be used at any one time in a symbol former; groups of said symbol selectors comprising a symbol selector from each series being arranged in a row in simulation of the series of symbol formers on the sign; the corresponding connector contacts in each series of symbol selectors being connected together and to the current responsive devices of the symbol formers in the same order of occurrence of the symbol formers on the sign and the symbol selectors; distributor means having a number of stationary contacts corresponding to the number of groups of symbol selectors; a conductor connected to one of the stationary contacts; and a valve conductor including a one-way current flow valve in series therein extending from each of the additional connector contacts of all such connector contacts occurring in a single group of single selectors.

6. In an electric sign system: a sign having a series of symbol formers each of which symbol formers includes a plurality of symbol forming parts usable in combinations of one or more parts to effect by each combination a distinct symbol in each symbol former; a corresponding plurality of current responsive devices for individually rendering the parts effective; a control panel having a series of symbol selectors corresponding to each symbol former in the sign, each symbol selector including a group of connector contacts, there being a connector contact in each symbol selector corresponding to each current responsive device in a symbol former, and a plurality of at least as many additional connector contacts in each symbol selector as the maximum number of symbol forming parts ever required to be used at any one time in a symbol former; groups of said symbol selectors comprising a symbol selector from each series being arranged in a row on the panel in simulation of the series of symbol formers on the sign; the corresponding connector contacts in each series of symbol selectors being connected together and to the current responsive devices of the symbol formers in the same order of occurrence of the symbol formers on the sign and the symbol selectors on the panel; distributor means having a number of stationary contacts corresponding to the number of groups of symbol selectors on the panel; a conductor connected to one of the stationary contacts; and a valve conductor including a one-way current flow valve in series therein extending from each of the additional connector contacts of all such connector contacts occurring in a single group of single selectors.

7. In an electric system, in combination: an apparatus having a series of units, each unit of which includes a plurality of electrically operable parts usable in combination of one or more parts to effect by each combination a distinct result in each unit; a corresponding plurality of current responsive devices for individually rendering the parts effective; a control panel having a series of unit selectors corresponding to each unit in the apparatus, each unit selector including a group of connector contacts, there being a connector contact in each unit selector corresponding to each current responsive device in a unit, and a plurality of at least as many additional connector contacts in each unit selector as the maximum number of unit forming parts ever required to be used concurrently; groups of said unit selectors comprising a unit selector from each series being arranged in a row on the panel in simulation of the series of units on the apparatus; corresponding connector contacts in each series of unit selectors being connected together and to the current responsive devices of the units in the same order of occurrence of the units on the apparatus and the unit selectors on the panel; switch means having a number of stationary contacts corresponding to the number of groups of unit selectors; an extension conductor connected to one of the stationary contacts of the switch means; and a conductor including a one-way current flow valve in series therein extending from each of the additional connector contacts of all such connector contacts occurring in a single group of unit selectors to the switch conductor.

8. In an electric system, in combination: an apparatus having a panel and a series of units, each unit of which includes a plurality of electrically operable parts usable in combination of one or more parts to effect by each combination a distinct result in each unit; a corresponding plurality of current responsive devices for individually rendering the parts effective; a series of unit selectors corresponding to each unit in the apparatus, each unit selector including a group of connector contacts, there being a connector contact in each unit selector corresponding to each current responsive device in a unit, and a plurality of at least as many additional connector contacts in each unit selector as the maximum number of unit forming parts ever required to be used concurrently; groups of said unit selectors comprising a unit selector from each series being arranged in a row in simulation of the series of units on the apparatus; corresponding connector contacts in each series of unit selectors being connected together and to the current responsive devices of the units in the same order of occurrence of the units on the apparatus and the unit selectors on the panel; switch means having a number of stationary contacts corresponding to the number of groups of unit selectors; an extension conductor connected to one of the stationary contacts of the switch means; and a conductor including a one-way current flow valve in series therein extending from each of the additional connector contacts of all such connector contacts occurring in a single group of unit selectors to the switch conductor.

MOSES ALLEN.

REFERENCES CITED

The following references are of record in the file of this patent:

UNITED STATES PATENTS

| Number | Name | Date |
|---|---|---|
| Re. 18,466 | Duross | May 17, 1932 |
| 1,245,467 | Kingsbury | Nov. 6, 1917 |
| 1,763,113 | Wensley | June 10, 1930 |
| 1,795,536 | Baker | Mar. 10, 1931 |
| 2,032,518 | Wheelock | Mar. 3, 1936 |
| 2,290,261 | Welch | July 21, 1942 |

FOREIGN PATENTS

| Number | Country | Date |
|---|---|---|
| 1,017 of 1898 | Great Britain | Feb. 19, 1898 |
| 499,900 | Great Britain | Jan. 31, 1931 |